US012065334B2

(12) United States Patent
Lee

(10) Patent No.: US 12,065,334 B2

(45) Date of Patent: Aug. 20, 2024

(54) WORK POSITION GUIDE APPARATUS OF AUTONOMOUS YARD TRACTOR

(71) Applicant: TOTAL SOFT BANK LTD., Busan (KR)

(72) Inventor: Hoon Lee, Busan (KR)

(73) Assignee: TOTAL SOFT BANK LTD., Busan (KR)

(*) Notice: Subject to any disclaimer, the term of this patent is extended or adjusted under 35 U.S.C. 154(b) by 0 days.

(21) Appl. No.: 18/521,535

(22) Filed: Nov. 28, 2023

(65) Prior Publication Data

US 2024/0174494 A1 May 30, 2024

(30) Foreign Application Priority Data

Nov. 29, 2022 (KR) ........................ 10-2022-0162810

(51) Int. Cl.
*G06F 7/00* (2006.01)
*B66C 13/46* (2006.01)

(52) U.S. Cl.
CPC .................................... *B66C 13/46* (2013.01)

(58) Field of Classification Search
CPC ...................................................... B66C 13/46
See application file for complete search history.

(56) References Cited

U.S. PATENT DOCUMENTS 8,561,897 B2 * 10/2013 Kunzig .............. G06Q 10/0875 235/385
2020/0307575 A1 * 10/2020 Lyngbäck ......... B60W 30/0956

FOREIGN PATENT DOCUMENTS

JP 2022-515809 A 2/2022
KR 10-2010-0011376 A 2/2010
KR 10-2296177 B1 9/2021

* cited by examiner

*Primary Examiner* — Yolanda R Cumbess

(74) *Attorney, Agent, or Firm* — Bridgeway IP Law Group, PLLC; Jihun Kim

(57) ABSTRACT

A work position guide apparatus for guiding an autonomous yard tractor to a work position, includes a reference position determination unit that determines a reference position based on a position of a crane located at a work position, a real-time position detection unit that detects a real-time position of the autonomous yard tractor, an error data acquisition unit that acquires error data between the reference position and the real-time position, and a guide command generation unit that generates a guide command for guiding the autonomous yard tractor to the work position based on the error data.

9 Claims, 6 Drawing Sheets

WORK POSITION GUIDE APPARATUS OF AUTONOMOUS YARD TRACTOR

CROSS-REFERENCE TO RELATED APPLICATIONS

This application claims the priority of Korean Patent Application No. 10-2022-0162810 filed on Nov. 29, 2022, in the Korean Intellectual Property Office, the disclosure of which is incorporated herein by reference in its entirety.

BACKGROUND OF THE INVENTION

Field of the Invention

The present disclosure relates to a work position guide apparatus of an autonomous yard tractor driving in a port.

This research was supported by Korea Institute of Marine Science & Technology Promotion (KIMST) funded by the Ministry of Oceans and Fisheries (20220583).

Background of the Related Art

A yard tractor is a tractor that tows a yard chassis within a container terminal to transport and load containers between a dock and a container yard.

In recent years, a connected autonomous yard tractor (CAYT), which can automatically transport containers to a desired position in an unmanned manner by applying autonomous driving technology to a yard tractor, has been developed.

In the related art, a longitudinal reference distance error is displayed through an electronic sign attached to a facility to guide a work position of the yard tractor.

However, when autonomous driving technology is applied to the yard tractor to operate in an unmanned manner, a technology that can guide an unmanned yard tractor to a correct position through V2X communication is needed.

Additionally, a technology that can calculate not only a longitudinal reference distance error but also a rotation angle error is needed.

SUMMARY OF THE INVENTION

A technical problem to be solved according to an embodiment of the present disclosure includes guiding an autonomous yard tractor to a correct position on a work position of the autonomous yard tractor.

Technical problems to be solved in the present disclosure may not be limited to the above-described problems and other technical problems, which are not mentioned herein, will definitely be understood by those skilled in the art from the following description.

In order to solve the foregoing problems, a work position guide apparatus for guiding an autonomous yard tractor to a work position of the autonomous yard tractor according to an aspect of the present disclosure may include a reference position determination unit that determines a reference position of the autonomous yard tractor based on a position of a crane located at a work position of the autonomous yard tractor, a real-time position detection unit that detects a real-time position of the autonomous yard tractor, an error data acquisition unit that acquires error data between the reference position of the autonomous yard tractor and the real-time position of the autonomous yard tractor, and a guide command generation unit that generates a guide command for guiding the autonomous yard tractor to the work position of the autonomous yard tractor based on the error data.

Here, the autonomous yard tractor may include a receiving unit that receives the guide command from the guide command generation unit, and the receiving unit may receive the guide command through V2X communication.

Here, the autonomous yard tractor may include a setting unit that sets the posture and driving direction of the autonomous yard tractor based on the guide command.

Here, the real-time position detection unit may include laser scanners provided in an external quay crane and a yard crane.

Here, the reference position determination unit may receive an unloading position of a container in the autonomous yard tractor, and determine the work position of the autonomous yard tractor based on the unloading position.

Here, the reference position determination unit may acquire coordinate values of the reference positions of the autonomous yard tractor based on the positions of a plurality of lanes included at a bottom of the crane included in the work position of the autonomous yard tractor.

Here, the real-time position detection unit may detect the real-time position of the autonomous yard tractor to acquire a coordinate value of the real-time position of the autonomous yard tractor, and the error data acquisition unit may acquire error data between the coordinate value of the reference position of the autonomous yard tractor and the coordinate value of the real-time position of the autonomous yard tractor.

Here, the error data acquisition unit may calculate errors in longitudinal direction, transverse direction, and rotation angle between the reference position of the autonomous yard tractor and the real-time position of the autonomous yard tractor.

Here, the guide command generation unit may determine that the autonomous yard tractor is located within the reference position of the autonomous yard tractor when the error data is within a preset allowable error range, and generate the guide command for moving the position of the autonomous yard tractor when the error data exceeds the allowable error range.

Here, the guide command generation unit may accept a participation request from an external terminal using an augmented reality (AR) or virtual reality (VR) service, and generate the AR or VR service based on the guide command to transmit the generated service to the external terminal.

As described above, according to embodiments and various aspects of the present disclosure, an autonomous yard tractor may be guided to a correct position on a work position of the autonomous yard tractor through V2X communication.

It is to be understood that the effects of the present disclosure are not limited to the foregoing effects, and include all effects that may be deduced from the features described in the detailed description of the invention or the claims.

DESCRIPTION OF SYMBOLS

Figure 1:
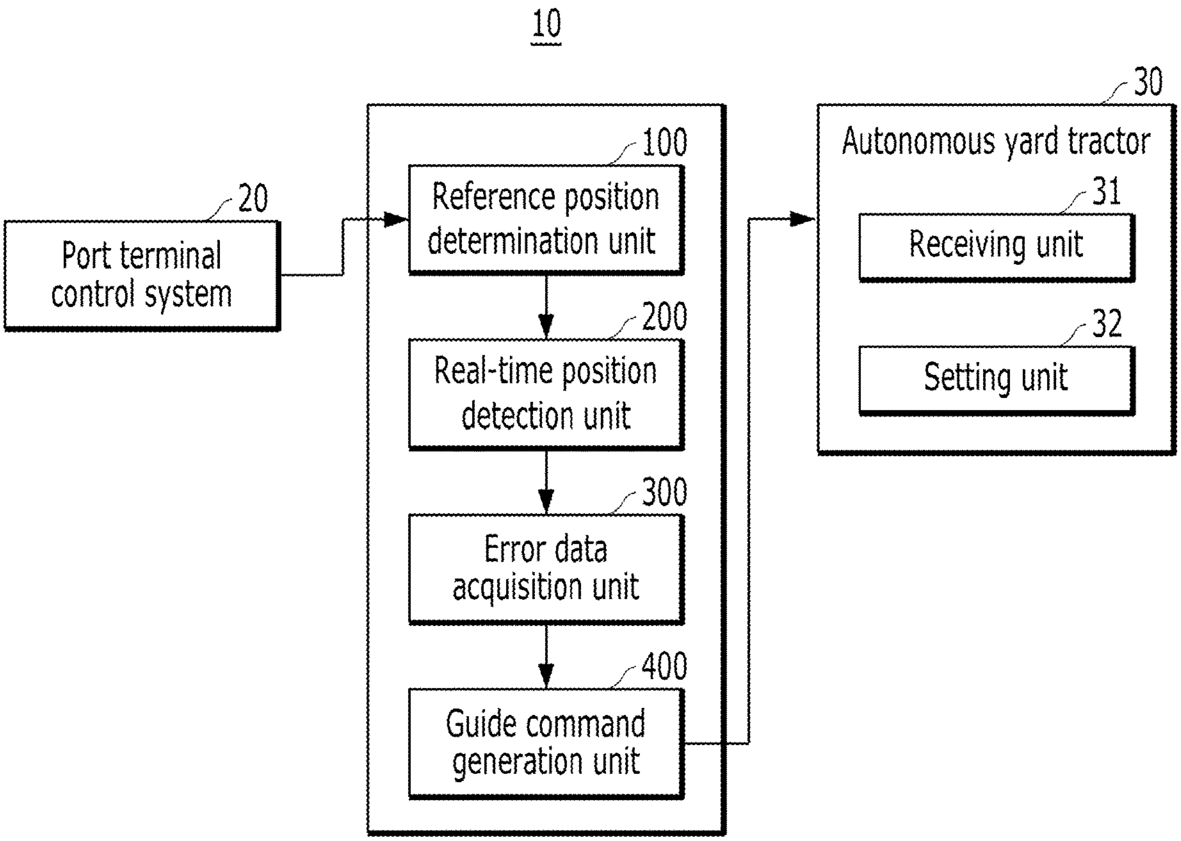
FIG. 1 is a block diagram showing a work position guide apparatus of an autonomous yard tractor according to an embodiment of the present disclosure.

10: Work position guide apparatus
100: Reference position determination unit
200: Real-time position detection unit
300: Error data acquisition unit
400: Guide command generation unit

DETAILED DESCRIPTION OF THE PREFERRED EMBODIMENT

Hereinafter, the present disclosure will be described with reference to the accompanying drawings. However, the present disclosure may be implemented in various different forms, and therefore, is not limited to the embodiments described herein. In order to clearly describe the present disclosure, parts not related to the description are omitted, and like reference numerals designate like parts throughout the specification.

Throughout the specification, in case where a portion is "connected to (coupled to, in contact with, in combination with" the other portion, it may include a case of being "indirectly connected to" the other portion by interposing another member therebetween as well as a case of being "directly connected to" the other portion. Furthermore, when a portion may "include" a certain element, unless specified otherwise, it may not be construed to exclude another element but may be construed to further include other elements.

It should be noted that terms used herein are merely used to describe specific embodiments, but not to limit the present disclosure. As used herein, the singular forms are intended to include the plural forms as well, unless the context clearly indicates otherwise. Terms "include" or "have" used herein should be understood that they are intended to indicate the presence of a feature, a number, a step, an element, a component or a combination thereof disclosed in the specification, and it may also be understood that the presence or additional possibility of one or more other features, numbers, steps, elements, components or combinations thereof are not excluded in advance.

Hereinafter, embodiments of the present disclosure will be described in detail with reference to the accompanying drawings.

An embodiment of the present disclosure relates to a work position guide apparatus of an autonomous yard tractor.

FIG. 1 is a block diagram showing a work position guide apparatus of an autonomous yard tractor according to an embodiment of the present disclosure.

Referring to FIG. 1, a work position guide apparatus 10 of an autonomous yard tractor according to an embodiment of the present disclosure includes a reference determination unit 100, a real-time position detection unit 200, an error data acquisition unit 300, and a guide command generation unit 400.

The work position guide apparatus 10 of the autonomous yard tractor according to an embodiment of the present disclosure is an apparatus that receives work position information from a control system in a port terminal to guide the autonomous yard tractor to a work position of the autonomous yard tractor.

Here, the autonomous yard tractor may include a connected autonomous yard tractor (CAYT).

In an embodiment of the present disclosure, the work position of the autonomous yard tractor may be a position where an in-port CAYT performs container loading and unloading work based on unloading equipment, and may include a position for performing battery charging and replacement or the like.

In addition, the reference position of the autonomous yard tractor may refer to at least one contact point at the time of stopping of the CAYT at a correct position in order for the CAYT to be accurately located at the work position of the autonomous yard tractor, and the reference position of the CAYT in an embodiment of the present disclosure may be acquired as a coordinate value corresponding to the contact point.

The reference position determination unit 100 receives work position information from a control system 20 in a port terminal, and determines a reference position of the autonomous yard tractor based on the position of a crane located at the work position of the autonomous yard tractor.

A process of determining, by the reference position determination unit 100, a reference position of the autonomous yard tractor will be described in detail in FIG. 3 below.

The real-time position detection unit 200 detects a real-time position of the autonomous yard tractor.

According to an embodiment of the present disclosure, the real-time position detection unit 200 may include laser scanners provided in an external quay crane and a yard crane.

Specifically, a 2D laser scanner method utilizing a SICK sensor may be used to recognize an autonomous yard tractor in a two-dimensional plane space so as to automatically recognize a direction of movement, and acquire longitudinal direction data, traverse direction data and rotational error data of the autonomous yard tractor based on end point.

In an embodiment of the present disclosure, it has been described that laser scanners are provided in an external quay crane and a yard crane, but they may be provided in various port facilities that can recognize an autonomous yard tractor.

The error data acquisition unit 300 acquires error data between the reference position of the autonomous yard tractor and the real-time position of the autonomous yard tractor.

Specifically, the real-time position detection unit 200 detects the real-time position of the autonomous yard tractor to acquire a coordinate value of the real-time position of the autonomous yard tractor, and the error data acquisition unit 300 acquires error data between the coordinate value of the reference position of the autonomous yard tractor and the coordinate value of the real-time position of the autonomous yard tractor.

The error data acquisition unit 300 according to an embodiment of the present disclosure calculates errors in longitudinal direction, traverse direction, and rotation angle between the reference position of the autonomous yard tractor and the real-time position of the autonomous yard tractor.

The guide command generation unit 400 generates a guide command for guiding the autonomous yard tractor to the work position of the autonomous yard tractor based on the error data.

Here, the guide command is generated to move the position of the autonomous yard tractor in a direction to offset errors of the position of the autonomous yard tractor in longitudinal direction, traverse direction, and rotation angle between the reference position of the autonomous yard tractor and the real-time position of the autonomous yard tractor.

Specifically, the guide command generation unit 400 determines that the autonomous yard tractor is located within the reference position of the autonomous yard tractor when the error data is within a preset allowable error range, and generates a guide command for moving the position of the autonomous yard tractor when the error data exceeds the allowable error range.

The autonomous yard tractor 30 according to an embodiment of the present disclosure includes a receiving unit 31 and a setting unit 32.

The receiving unit 31 receives a guide command from the guide command generation unit.

According to an embodiment of the present disclosure, the receiving unit of the autonomous yard tractor 31 may receive a guide command through V2X communication.

Specifically, the autonomous yard tractor 30 may be equipped with a communication interface that supports vehicle-to-X (V2X) communication to receive signal information from facilities or vehicles located around the autonomous yard tractor through V2X communication.

X in V2X refers to everything, for example, infra/vehicle/nomadic, and the like. The X refers to all types of communication methods applicable to vehicles, and refers to a specific communication technology for implementing a connected vehicle or a networked vehicle as a general term. Herein, the V2X communication may be broadly divided into three categories, vehicle-to-infrastructure (V2I), vehicle-to-vehicle (V2V), and vehicle-to-nomadic devices (V2N). It is expected that other types of recent communication categories will be added.

The setting unit 32 sets the posture and driving direction of the autonomous yard tractor based on the guide command.

An execution step that is performed in the work position guide apparatus of the autonomous yard tractor according to an embodiment of the present disclosure may be implemented in each processor or implemented in a single integrated processor.

Figure 2:
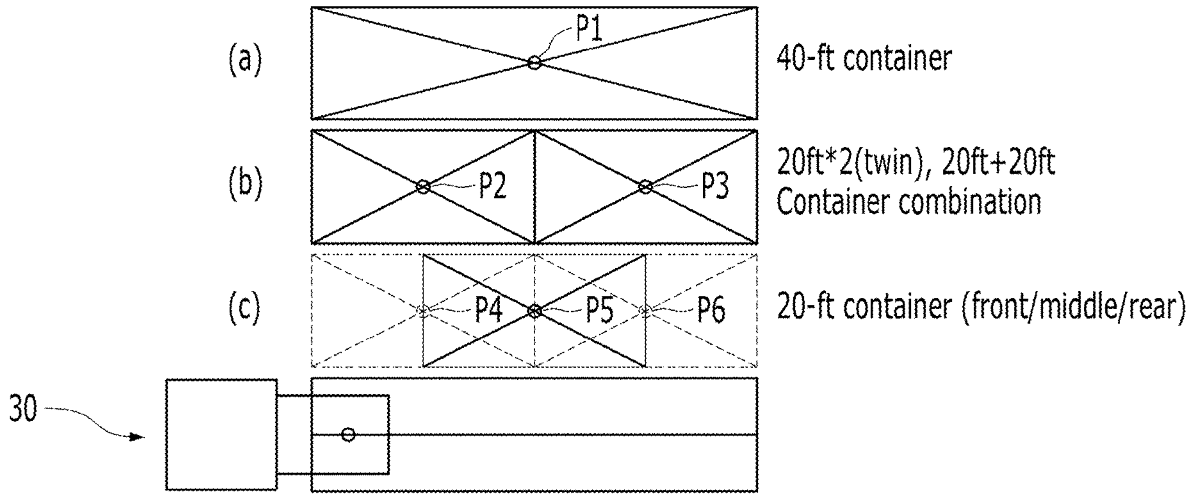
FIG. 2 is a diagram showing an example of a reference position of the autonomous yard tractor for each container size in a work position guide apparatus of an autonomous yard tractor according to an embodiment of the present disclosure.

FIG. 2 is a diagram showing an example of a reference position of the autonomous yard tractor for each container size in a work position guide apparatus of an autonomous yard tractor according to an embodiment of the present disclosure.

A spreader of the port crane picks up a container of the autonomous yard tractor 30 to raise and lower the container.

Accordingly, the autonomous yard tractor 30 must be located exactly at the position of the spreader, and the work position guide apparatus of the autonomous yard tractor according to an embodiment of the present disclosure may determine the reference position of the autonomous yard tractor coupled to the spreader depending on the container size.

(a) of FIG. 2 shows a 40-ft container, wherein a first reference position of the autonomous yard tractor (P1) may be a mounting hole located at a center point of the four corners.

(b) of FIG. 2 shows a combination of two 20-ft containers, wherein a second reference position of the autonomous yard tractor (P2) and a third reference position of the autonomous yard tractor (P3) may be mounting holes located at center points of the four corners of each of the two containers.

(c) of FIG. 2 shows reference positions of the autonomous yard tractor according to a reference loading position of the 20-ft container on the chassis, respectively, and includes a fourth reference position of the autonomous yard tractor (P4) located in a front portion of the container, a fifth reference position of the autonomous yard tractor (P5) located in a middle portion of the container, and a sixth reference position of the autonomous yard tractor (P6) located in a rear portion of the container.

In the work position guide apparatus of the autonomous yard tractor according to an embodiment of the present disclosure, when the reference position determination unit 100 sets a reference position of the autonomous yard tractor for each container size, the real-time position detection unit 200 detects the real-time position of the autonomous yard tractor to acquire a coordinate value of the real-time position of the autonomous yard tractor, and the error data acquisition unit 300 acquires error data between the coordinate value of the reference position of the autonomous yard tractor and the coordinate value of the real-time position of the autonomous yard tractor.

Then, the guide command generation unit 400 generates a guide command for guiding the autonomous yard tractor to the work position of the autonomous yard tractor based on the error data.

Accordingly, in a situation where the freedom to move the spreader is limited, the autonomous yard tractor may be controlled to match the center point of the container chassis with the center point of the spreader on a virtual line.

Figure 3:
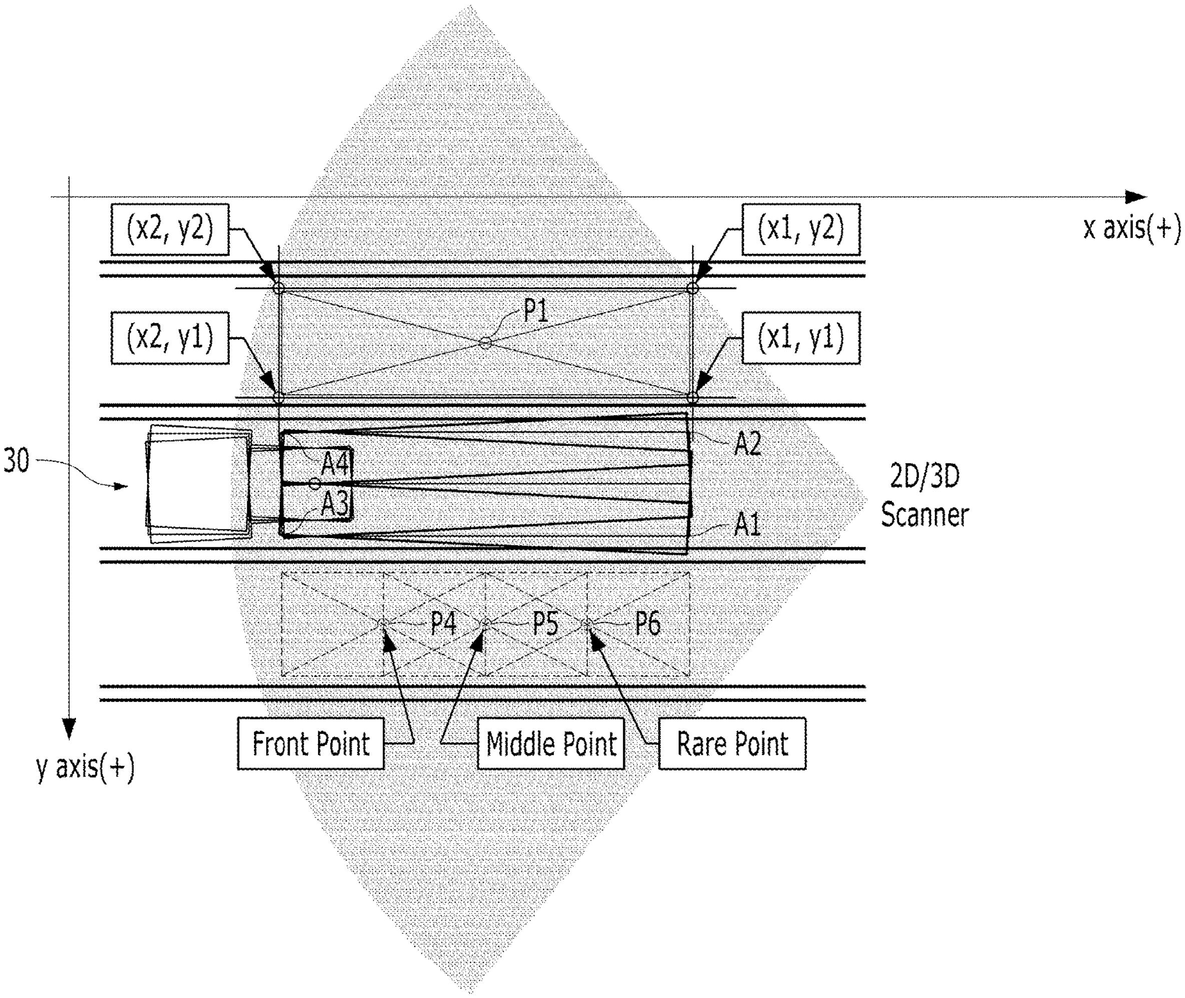
FIG. 3 is a diagram showing as an example a process of acquiring reference position coordinate values in a work position guide apparatus of an autonomous yard tractor according to an embodiment of the present disclosure.

FIG. 3 is a diagram showing as an example a process of acquiring reference position coordinate values in a work position guide apparatus of an autonomous yard tractor according to an embodiment of the present disclosure.

The reference position determination unit 100 according to an embodiment of the present disclosure receives an unloading position of the container of the autonomous yard tractor 30, and determines a work position of the autonomous yard tractor based on the unloading position.

In an embodiment of the present disclosure, the work position of the autonomous yard tractor may be a position where an in-port CAYT performs a container loading and unloading work based on unloading equipment.

Referring to FIG. 3, the reference position determination unit 100 determines a stop position of the vehicle as a work position of the autonomous yard tractor based on the lane.

For example, a chassis stop position of the vehicle may be determined based on three lanes under a quay crane (QC). Here, the number of lanes under QC may consist of 5 to 8 on average.

Then, the coordinate value of the reference position of the autonomous yard tractor is acquired based on the positions of a plurality of lanes included at the bottom of the crane included in the work position of the autonomous yard tractor.

Accordingly, the coordinate values of the four corners of the work position of the autonomous yard tractor, (x1, y1), (x1, y2), (x2, y1), (x2, y2), and the coordinate value of the first reference position of the autonomous yard tractor (P1)

located at the center point of the four corners may be acquired as the coordinate values of the reference positions of the autonomous yard tractor.

In addition, based on the coordinate values of the four corners of the work position of the autonomous yard tractor, (x1, y1), (x1, y2), (x2, y1), (x2, y2), according to a container unloading position on the chassis, the fourth reference position of the autonomous yard tractor (P4) located in a front portion, the fifth reference position of the autonomous yard tractor (P5) located in a middle portion, and the sixth reference position of the autonomous yard tractor (P6) located in a rear portion may be acquired as the coordinate values of the reference positions, respectively.

Meanwhile, the real-time position detection unit 200 detects the real-time position of the autonomous yard tractor using a laser scanner to acquire the coordinate value of the real-time position of the autonomous yard tractor.

Referring to FIG. 3, the coordinate values of the four corner positions A1, A2, A3, A4 in an area where the autonomous yard tractor 30 is located may be acquired as the coordinate values of the real-time positions of the autonomous yard tractor.

Accordingly, virtual lines of an area where the autonomous yard tractor 30 is located and virtual lines of a work position area according to the container unloading position on the chassis may be matched with each other.

Then, the error data acquisition unit 300 acquires error data between the coordinate value of the reference position of the autonomous yard tractor and the coordinate value of the real-time position of the autonomous yard tractor, and calculates errors in longitudinal direction, traverse direction, and rotation angle between the reference position of the autonomous yard tractor and the real-time position of the autonomous yard tractor.

Figure 4:
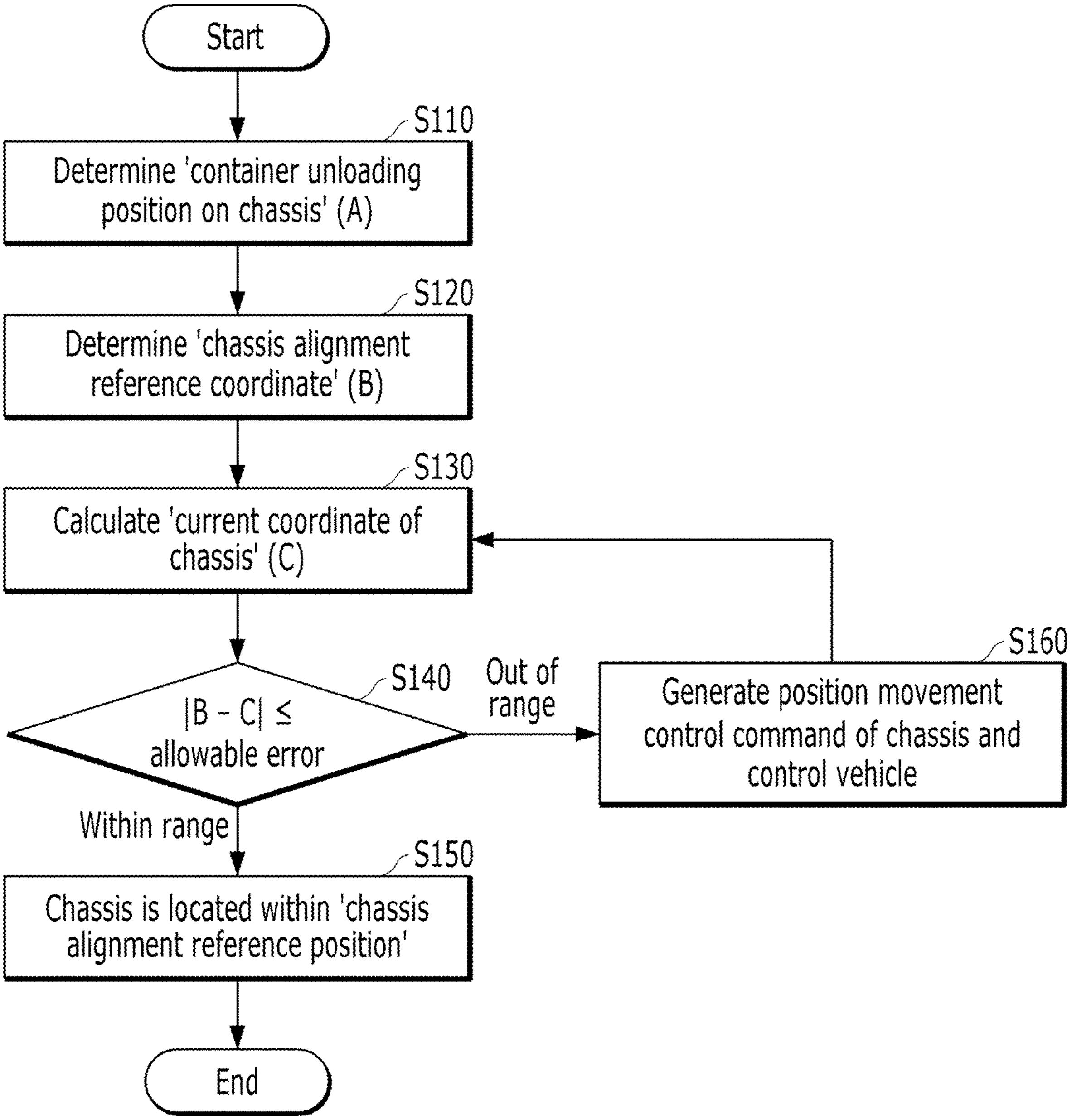
FIG. 4 is a flowchart showing a work position guide method performed by a work position guide apparatus of an autonomous yard tractor according to an embodiment of the present disclosure.

FIG. 4 is a flowchart showing a work position guide method performed by a work position guide apparatus of an autonomous yard tractor according to an embodiment of the present disclosure.

Referring to FIG. 4, the work position guide method performed by the work position guide apparatus of the autonomous yard tractor determines a container unloading position on the chassis in step S110.

Specifically, the center point of loading or unloading is determined, and the container unloading position on the chassis may include front, middle, and rear center points of FIG. 3.

In step S120, the coordinate value of the reference position of the autonomous yard tractor, which is a chassis alignment reference coordinate that is a reference of a chassis reference stop position, is determined.

Base coordinates={(bx1, by1), (bx1, by2), (bx2, by1), (bx2, by2)}

In step S130, the coordinate value of the real-time position of the autonomous yard tractor, which is a current coordinate of the chassis, is calculated.

Current chassis coordinates={(cx1, cy1), (cx1, cy2), (cx2, cy1), (cx2, xy2)}

In step S140, an error between chassis alignment reference coordinates and current coordinates of the chassis is calculated to calculate a vehicle control reference.

Here, the vehicle control item may include at least one of forward, backward, and steering, and the vehicle control reference may include at least one of an operation unit, a movement distance, and a rotation angle.

Example) (S, 0.5°), (F, 150 mm), (S, −0.2°), (F, 250 mm)

If the error data is within a preset allowable error range in step S150, then it is determined that the autonomous yard tractor is located within the reference position of the autonomous yard tractor.

In step S160, when the error data exceeds the allowable error range, a guide command is generated to move the position of the autonomous yard tractor.

In addition, depending on the allowable error range, it may be possible to control the movement of either the spreader or the autonomous yard tractor by selecting a method that takes less time and cost.

Figure 5A:
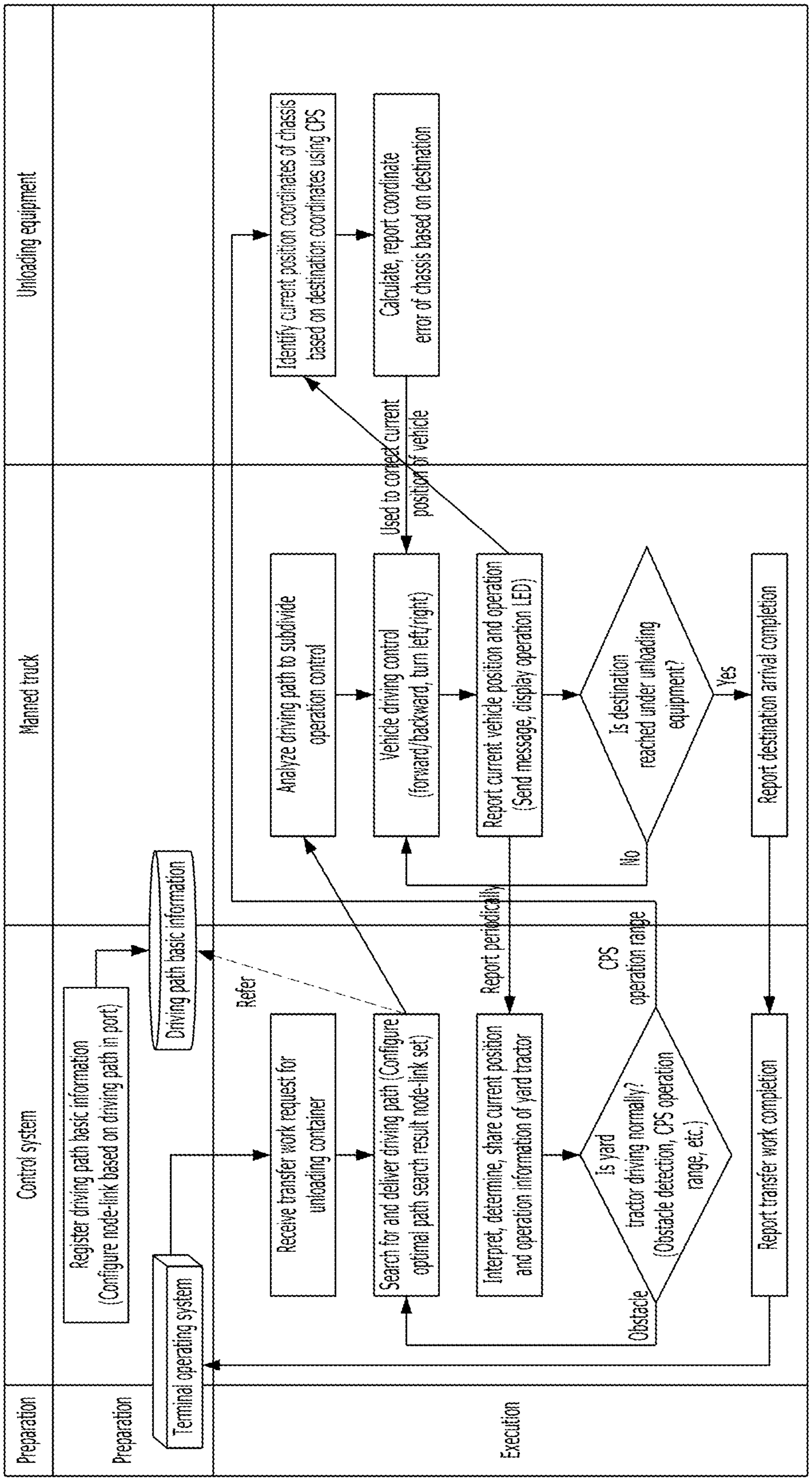
FIGS. 5A and 5B are diagrams for explaining a configuration relationship of a control system to which a work position guide apparatus of an autonomous yard tractor according to an embodiment of the present disclosure is applied.
Figure 5B:
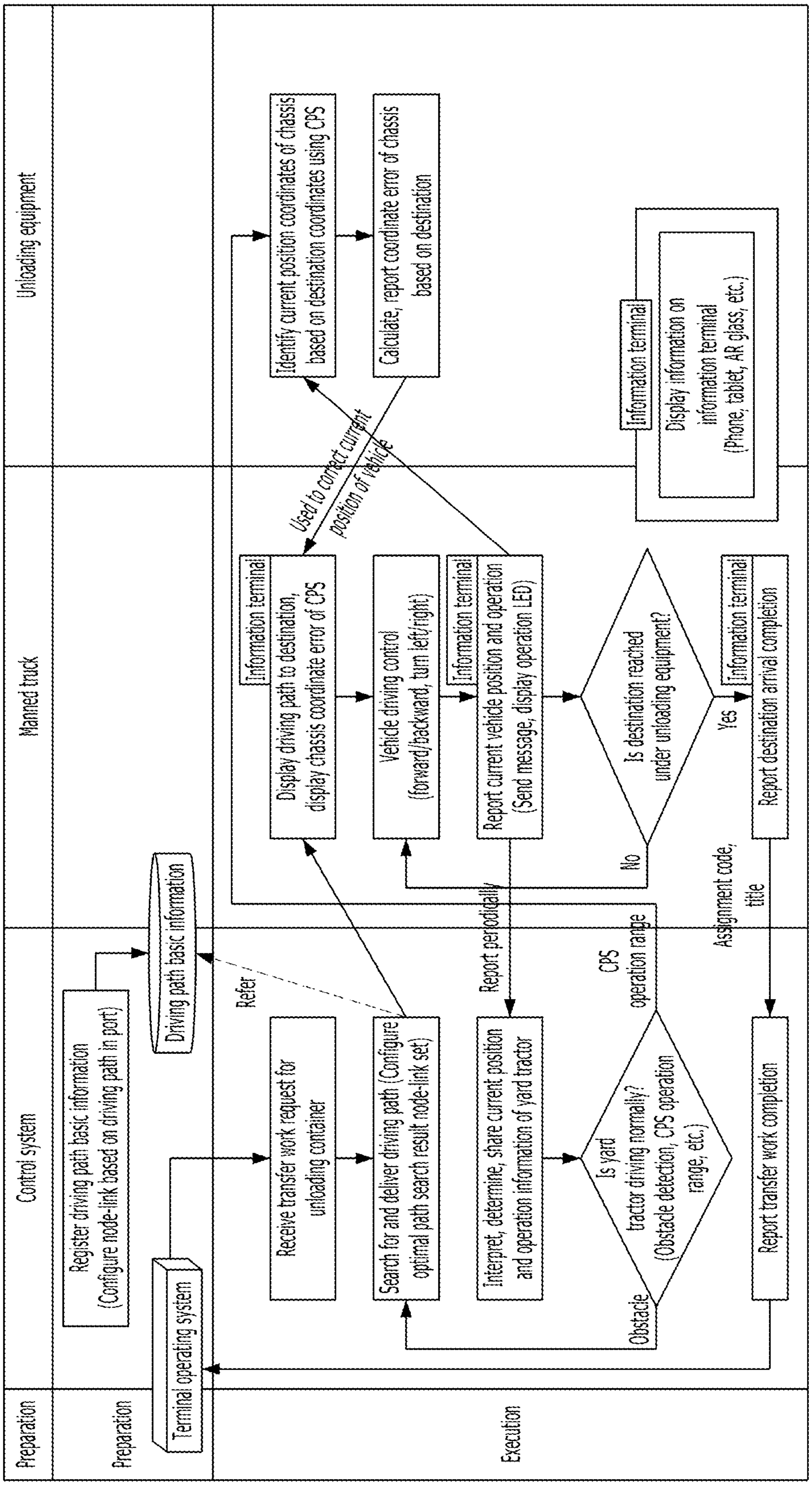

FIGS. 5A and 5B are diagrams for explaining a configuration relationship of a control system to which a work position guide apparatus of an autonomous yard tractor according to an embodiment of the present disclosure is applied.

FIG. 5A shows a configuration in which a connected autonomous yard tractor is applied, and FIG. 5B shows a configuration in which a manned truck is applied.

Referring to FIGS. 5A and 5B, in a preparation step, the control system registers basic driving path information (node-link) and receives a transfer work request for container unloading from a terminal operating system (TOS).

Furthermore, the control system searches for a driving path using 'basic driving path information' and delivers a result thereof to a yard tractor.

Then, the yard tractor analyzes the driving path information received from the control system to subdivide operation control for vehicle control, and controls the driving of the vehicle using the subdivided operation control information. (forward/backward, turn left/right)

The yard tractor periodically reports a current vehicle position and operation information and displays them on an LED display board.

The control system can request for a CPS operation of unloading equipment when the yard tractor is located within a CPS operation range.

Additionally, when the CPS of the unloading equipment identifies the yard tractor within the CPS operation range, the CPS operation is performed.

The CPS of the unloading equipment identifies current position coordinates of the chassis with respect to the destination coordinates, and calculates a coordinate error of the chassis with respect to the destination to transmit the relevant information to the yard tractor.

The yard tractor uses the coordinate error of the chassis with respect to the destination for precise control of the driving of the vehicle.

The yard tractor determines whether the destination has been reached, branches off to vehicle driving control when not reached, and reports completion upon arrival at the destination.

The control system reports the completion of the transfer work to the terminal operation system based on the destination arrival completion report.

A manned truck driver identifies and determines the current operation status and planned operation of the yard tractor through the LED display board attached to the yard tractor.

As shown in FIG. 5B, if an information terminal is used, then the current vehicle position and operation information is received to display the relevant information on the information terminal.

Specifically, the guide command generation unit accepts a participation request from an external terminal using an augmented reality (AR) or virtual reality (VR) service, and generates the AR or VR service based on a guide command to transmit the generated AR or VR service to the external terminal.

According to an embodiment of the present disclosure, there is provided a computer-readable recording medium on which a program for performing on a computer is recorded, wherein the program performs an operation display method that is carried out on an operation display apparatus of an autonomous yard tractor.

The computer-readable recording medium may include program instructions, data files, data structures, and the like, alone or in combination thereof. The program instructions recorded in the recording medium may be designed and configured especially for the present disclosure or may be known to and used by those skilled in computer software fields. Examples of the computer-readable recording medium include magnetic media such as hard disks, floppy disks, and magnetic tapes, optical media such as compact disk-read only memory (CD-ROM) and digital versatile disks (DVDs), magneto-optical media such as floptical disks, and hardware devices such as read-only memory (ROM), random access memory (RAM), and flash memory, which are specially configured to store and execute program instructions. Examples of the program instructions include not only machine language codes created by a compiler or the like, but also high-level language codes that can be executed by a computer using an interpreter or the like. The hardware devices may be configured to operate as one or more software modules in order to perform the operation of the present disclosure, and vice versa.

The foregoing description of the present disclosure is for illustrative purposes, but it will be apparent to those skilled in the art to which the invention pertains that the invention can be easily modified in other specific forms without departing from the technical concept and essential characteristics thereof. Therefore, it should be understood that embodiments described above are merely illustrative but not restrictive in all aspects. For example, each element described as a single entity may be distributed and implemented, and likewise, elements described as being distributed may also be implemented in a combined manner.

The scope of the present disclosure is defined by the appended claims, and all changes or modifications derived from the meaning and range of the claims and equivalents thereof should be construed to be embraced by the scope of the present disclosure.

What is claimed is:

1. A work position guide apparatus for guiding an autonomous yard tractor to a work position of the autonomous yard tractor, the apparatus comprising:

a reference position determination unit configured to determine at least one reference position of the autonomous yard tractor coupled to a spreader of a crane located at the work position of the autonomous yard tractor according to a size and number of containers in the autonomous yard tractor;

a real-time position detection unit configured to detect a real-time position of the autonomous yard tractor;

an error data acquisition unit configured to acquire error data between a reference position of the autonomous yard tractor and the real-time position of the autonomous yard tractor; and a guide command generation unit configured to generate a guide command for guiding the autonomous yard tractor to the work position of the autonomous yard tractor based on the error data, wherein the reference position determination unit is configured to obtain a coordinate value of the work position of the autonomous yard tractor based on positions of a plurality of lanes included at a bottom of the crane included in the work position of the autonomous yard tractor, and to acquire a coordinate value of the at least one reference position of the autonomous yard tractor based on the coordinate value of the work position of the autonomous yard tractor.

2. The apparatus of claim 1, wherein the autonomous yard tractor comprises a receiving unit configured to receive the guide command from the guide command generation unit, and wherein the receiving unit is configured to receive the guide command through V2X communication.

3. The apparatus of claim 1, wherein the autonomous yard tractor comprises a setting unit configured to set a posture and a driving direction of the autonomous yard tractor based on the guide command.

4. The apparatus of claim 1, wherein the real-time position detection unit comprises laser scanners provided in an external quay crane and a yard crane.

5. The apparatus of claim 1, wherein the reference position determination unit is configured to receive an unloading position of a container in the autonomous yard tractor, and to determine the work position of the autonomous yard tractor based on the unloading position.

6. The apparatus of claim 1, wherein the real-time position detection unit is configured to detect the real-time position of the autonomous yard tractor to acquire a coordinate value of the real-time position of the autonomous yard tractor, and wherein the error data acquisition unit is configured to acquire error data between the coordinate value of the reference position of the autonomous yard tractor and the coordinate value of the real-time position of the autonomous yard tractor.

7. The apparatus of claim 6, wherein the error data acquisition unit is configured to calculate errors in longitudinal direction, transverse direction, and rotation angle between the reference position of the autonomous yard tractor and the real-time position of the autonomous yard tractor.

8. The apparatus of claim 1, wherein the guide command generation unit is configured to determine that the autonomous yard tractor is located within the reference position when the error data is within a preset allowable error range, and to generate the guide command for moving the position of the autonomous yard tractor when the error data exceeds the allowable error range.

9. The apparatus of claim 1, wherein the guide command generation unit is configured to accept a participation request from an external terminal using an augmented reality (AR) or virtual reality (VR) service, and to generate the AR or VR service based on the guide command to transmit the generated service to the external terminal.

* * * * *